US006977472B2

(12) United States Patent
Matsubayashi et al.

(10) Patent No.: US 6,977,472 B2
(45) Date of Patent: Dec. 20, 2005

(54) ELECTRODELESS SELF-BALLASTED FLUORESCENT LAMP AND DISCHARGE LAMP OPERATING DEVICE

(75) Inventors: Yoko Matsubayashi, Nara (JP); Kenichiro Takahashi, Osaka (JP); Kouji Miyazaki, Osaka (JP); Satoshi Kominami, Osaka (JP); Toshiaki Kurachi, Osaka (JP); Mamoru Takeda, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 38 days.

(21) Appl. No.: 10/494,652

(22) PCT Filed: Jun. 6, 2003

(86) PCT No.: PCT/JP03/07234

§ 371 (c)(1),
(2), (4) Date: May 4, 2004

(87) PCT Pub. No.: WO03/105541

PCT Pub. Date: Dec. 18, 2003

(65) Prior Publication Data

US 2004/0263093 A1 Dec. 30, 2004

(30) Foreign Application Priority Data

Jun. 7, 2002 (JP) .............................. 2002-167580

(51) Int. Cl.[7] .............................................. G05F 1/00
(52) U.S. Cl. .................. 315/291; 315/307; 315/DIG. 4
(58) Field of Search ................................ 315/224, 225, 315/244, 248, 291, 307, 308, 360, DIG. 4, 315/DIG. 5, DIG. 7

(56) References Cited

U.S. PATENT DOCUMENTS

| 5,561,351 | A | * | 10/1996 | Vrionis et al. .............. 315/248 |
| 5,604,411 | A | * | 2/1997 | Venkitasubrahmanian et al. .......................... 315/307 |
| 6,392,366 | B1 | * | 5/2002 | Nerone ....................... 315/291 |
| 6,509,698 | B1 | * | 1/2003 | Kominami et al. ......... 315/291 |
| 6,657,401 | B2 | * | 12/2003 | Kominami et al. ......... 315/291 |
| 2001/0030514 | A1 | | 10/2001 | Takahashi et al. .......... 315/219 |

FOREIGN PATENT DOCUMENTS

| EP | 827184 A2 | 3/1998 |
| EP | 1128711 A2 | 8/2001 |
| EP | 1168893 A1 | 1/2002 |

(Continued)

OTHER PUBLICATIONS

International Search Report for PCT/JP03/07234 mailed Sep. 2, 2003; ISA/JPO.

*Primary Examiner*—Thuy V. Tran
(74) *Attorney, Agent, or Firm*—Harness, Dickey & Pierce, P.L.C.

(57) ABSTRACT

An electrodeless self-ballasted fluorescent lamp includes an electrodeless fluorescent lamp 3, a ballast circuit 4 and a lamp base which are formed as one unit. The ballast circuit 4 includes: an AC-DC converter 5; a DC-AC converter 6 formed so as to intermittently drive the electrodeless fluorescent lamp 3; and a dimming controller 7 formed so as to detect the turn-on of a phase-controlled AC voltage and output an intermittent command signal for changing the ratio between an operating period and an extinguishing period to the DC-AC converter 6. Furthermore, the dimming controller 7 is formed so as to output a signal for extinguishing the electrodeless fluorescent lamp 3 before the operation thereof becomes unstable.

9 Claims, 9 Drawing Sheets

FOREIGN PATENT DOCUMENTS

| | | |
|---|---|---|
| JP | 3-233894 A | 10/1991 |
| JP | 11111486 A | 4/1999 |
| JP | 2001313196 A | 11/2001 |
| JP | 2002134291 A | 5/2002 |

* cited by examiner

Relationship between phase-control angle and on duty ratio

FIG. 4B

Relationship between phase-control angle and on duty ratio

ELECTRODELESS SELF-BALLASTED FLUORESCENT LAMP AND DISCHARGE LAMP OPERATING DEVICE

CROSS-REFERENCE TO RELATED APPLICATIONS

This application is a National Stage of International Application No. PCT/JP03/07234, filed Jun. 6, 2003. This application claims the benefit of JP 2002-167580, filed Jun. 7, 2002. The disclosures of the above applications is incorporated herein by reference.

TECHNICAL FIELD

The present invention relates to discharge lamp operating devices. In particular, the present invention relates to electrodeless self-ballasted fluorescent lamps in which electrodeless fluorescent lamps can be dimmed.

BACKGROUND ART

A fluorescent lamp has been widely used from global environmental protection and economic standpoints because it has a higher degree of efficiency and a longer life as compared with an incandescent lamp. In recent years, as an economical light source, an electrodeless self-ballasted fluorescent lamp having no electrode has been attracting much attention since its life is several times longer than that of a conventional self-ballasted fluorescent lamp having electrodes, and the demand for an electrodeless self-ballasted fluorescent lamp is on the increase.

Furthermore, a self-ballasted fluorescent lamp in which a fluorescent lamp and a ballast circuit therefor are integrally formed is becoming a focus of attention as an energy-saving light source in houses, hotels, restaurants or the like, and is now becoming widespread because the self-ballasted fluorescent lamp can be readily used as it is in place of an incandescent lamp. In addition to the self-ballasted fluorescent lamp of this type having electrodes, the self-ballasted fluorescent lamp of this type having no electrode is also under development.

With the widespread use of the self-ballasted fluorescent lamp, as with a dimmable incandescent lamp, the need for dimming of the self-ballasted fluorescent lamp is being created. To be more specific, in houses or hotels, people carry out various daily living activities such as reading or spending a happy time with family, and in order to achieve a comfortable light environment adapted to these daily living activities, a user desires brightness suitable to each situation and seeks a function that realizes such brightness. Since an incandescent lamp does not emit light by discharge, it can be easily dimmed by merely adjusting electric power supplied thereto. On the other hand, since a fluorescent lamp emits light by discharge, it is difficult to implement a dimmable fluorescent lamp that can be practically used by merely adjusting electric power supplied thereto like an incandescent lamp.

Lately, in response to a need for a user to change brightness utilizing an already-known incandescent lamp dimmer as with an incandescent lamp, a self-ballasted fluorescent lamp with electrodes, which is connected to an incandescent lamp dimmer and allows dimmable operation, has been developed (see Japanese Unexamined Patent Publication No. 1999-111486, for example). However, the fact is that an electrodeless self-ballasted fluorescent lamp which is dimmable has not yet developed.

Besides, a self-ballasted fluorescent lamp having electrodes requires preheating of the electrodes for the discharge of electrons therefrom, and thus needs a voltage of a certain level. Therefore, if deeper dimming is carried out using a fluorescent lamp having electrodes, extinguishing occurs at the instant when a dimming voltage becomes lower than a voltage required for preheating of the electrodes, thus making it impossible to carry out smooth dimming.

The present applicant has already developed an electrodeless self-ballasted fluorescent lamp that is dimmable, and succeeded in completing such a lamp; however, this lamp still has inadequacies. For example, undesired extinguishing or flickering of the lamp occurs when low level dimming is carried out, and therefore, smooth dimming operation might not be achieved.

The present invention has been made in view of the above-described problems, and its main object is to provide an electrodeless self-ballasted fluorescent lamp and a discharge lamp operating device which achieve smooth dimming operation.

DISCLOSURE OF THE INVENTION

An inventive electrodeless self-ballasted fluorescent lamp includes: an electrodeless fluorescent lamp; a ballast circuit for applying a high-frequency voltage to the electrodeless fluorescent lamp; and a lamp base electrically connected to the ballast circuit, wherein the electrodeless fluorescent lamp, the ballast circuit and the lamp base are formed as one unit, wherein the ballast circuit includes: an AC-DC converter for converting a phase-controlled AC voltage into a DC voltage; a DC-AC converter for converting the DC voltage into a high-frequency voltage, the DC-AC converter being formed so as to intermittently drive the electrodeless fluorescent lamp due to the existence of an operating period during which the high-frequency voltage is applied to the electrodeless fluorescent lamp so that the electrodeless fluorescent lamp is operated, and an extinguishing period during which the generation of the high-frequency voltage is stopped so that the electrodeless fluorescent lamp is extinguished; and a dimming controller for detecting the turn-on of the phase-controlled AC voltage and for outputting an intermittent command signal that changes the ratio between the operating period and the extinguishing period to the DC-AC converter, and wherein the dimming controller is formed so as to output a signal for extinguishing the electrodeless fluorescent lamp before the operation thereof becomes unstable.

In one preferred embodiment, the dimming controller includes: a first dimming control signal input section and a second dimming control signal input section; a sawtooth wave generator for generating a sawtooth wave; and a dimming command signal generator for generating a dimming command signal, the first dimming control signal input section is connected to the sawtooth wave generator via a photo coupler, and the second dimming control signal input section is connected to the dimming command signal generator.

In one preferred embodiment, the sawtooth wave generator and the dimming command signal generator are connected to a comparator.

In one preferred embodiment, the dimming controller is further formed so as to output a signal for synchronizing the timing of the turn-on with that of the operation of the lamp intermittently driven by the DC-AC converter.

In one preferred embodiment, the dimming controller has a sawtooth wave generator including a differentiating circuit that includes a capacitor and a resistor, the differentiating circuit is connected to a collector terminal of a transistor for generating a pulse wave synchronized with the turn-on and turn-off of the phase-controlled AC voltage, an output terminal of the differentiating circuit is connected with an anode of a diode while a cathode of the diode is connected with a base terminal of a transistor for discharge, an emitter terminal of the transistor for discharge is connected with a diode for potential adjustment, and a capacitor for charge and discharge is connected between the emitter terminal and collector terminal of the transistor for discharge, thus allowing the generation of a sawtooth wave synchronized with the turn-on of the phase-controlled voltage.

In one preferred embodiment, the phase-controlled AC voltage is an output voltage of a dimmer which has been phase-controlled by the dimmer.

An inventive discharge lamp operating device includes: a discharge lamp; an AC-DC converter for converting a phase-controlled AC voltage into a DC voltage; a DC-AC converter for converting the DC voltage into a high-frequency voltage, the DC-AC converter intermittently driving the discharge lamp due to the existence of an operating period during which the high-frequency voltage is applied to the discharge lamp so that the discharge lamp is operated, and an extinguishing period during which the generation of the high-frequency voltage is stopped so that the discharge lamp is extinguished; and a dimming controller for detecting the turn-on of the phase-controlled AC voltage and for outputting an intermittent command signal that changes the ratio between the operating period and the extinguishing period to the DC-AC converter, wherein the discharge lamp is an electrodeless discharge lamp, and wherein the dimming controller is formed so as to output a signal for extinguishing the discharge lamp before the operation thereof becomes unstable.

In one preferred embodiment, the dimming controller is further formed so as to output a signal for synchronizing the timing of the turn-on with that of the operation of the lamp intermittently driven by the DC-AC converter.

In one preferred embodiment, the discharge lamp has a discharge bulb with a recessed portion, and an induction coil is inserted into the recessed portion of the discharge bulb.

BEST MODE FOR CARRYING-OUT OF THE INVENTION

Hereinafter, embodiments of the present invention will be described with reference to the drawings. In the following drawings, for simplification of the description, the same constituting elements having substantially identical functions are identified by the same reference characters. It should be noted that the present invention is not limited to the following embodiments.

Embodiment 1

Figure 1:
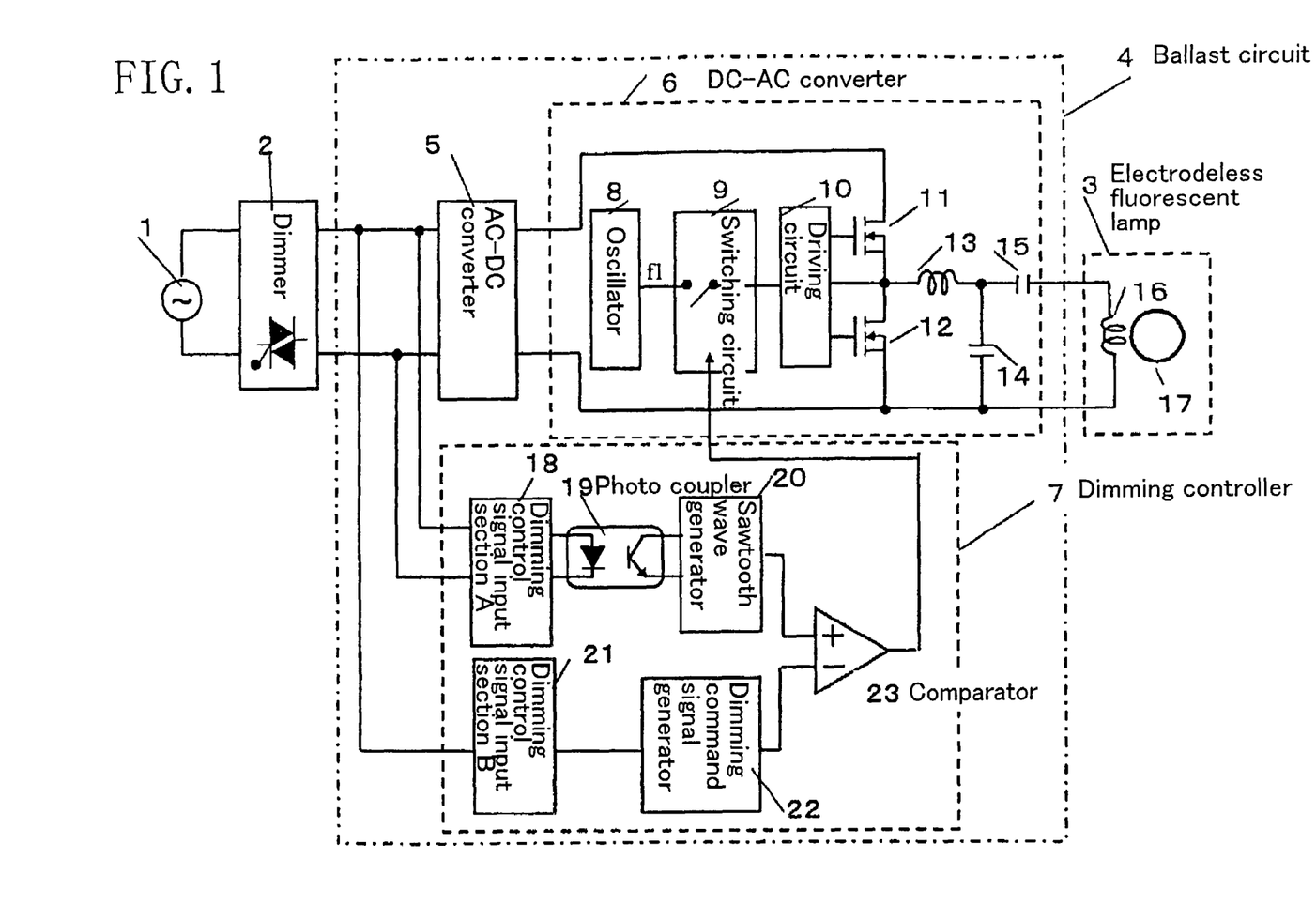
FIG. 1 is a diagram showing the circuit configuration of an electrodeless self-ballasted fluorescent lamp (or a discharge lamp operating device) according to a first embodiment of the present invention.

FIG. 1 schematically shows the configuration of a discharge lamp operating device according to a first embodiment of the present invention. And FIG. 2 is a cross-sectional view of the discharge lamp operating device of the present embodiment implemented as an electrodeless self-ballasted fluorescent lamp.

The electrodeless self-ballasted fluorescent lamp of the present embodiment includes: an electrodeless fluorescent lamp 3; a ballast circuit 4 (circuit board 54) for applying a high-frequency voltage to the electrodeless fluorescent lamp 3; and a lamp base 56 electrically connected to the ballast circuit 4 (circuit board 54). The circuit board 54 shown in FIG. 2 is formed with the ballast circuit 4 shown in FIG. 1. Specifically, the circuit board 54 is formed with wirings provided as shown in the ballast circuit 4, and is attached with respective circuit components.

Figure 2:
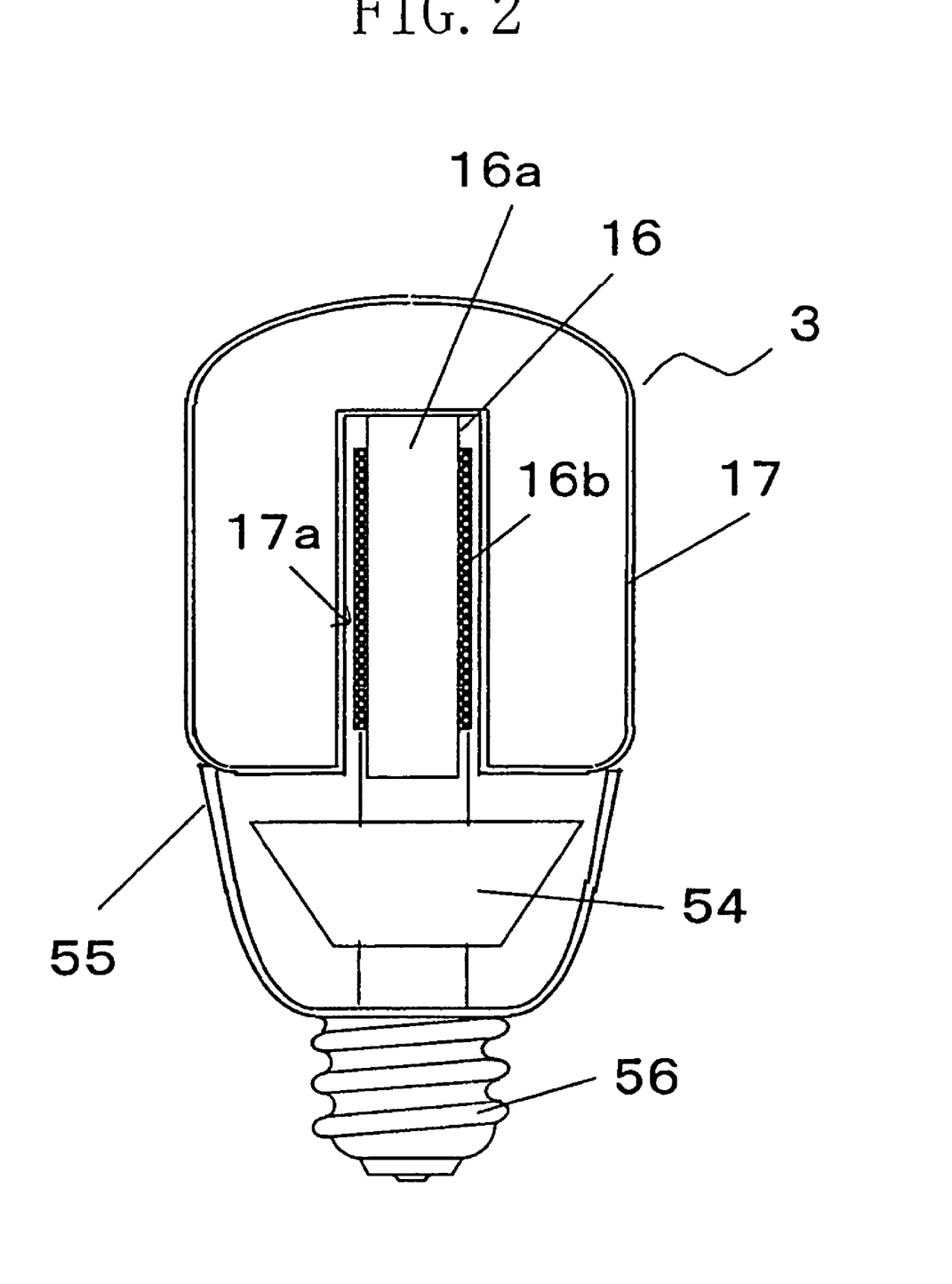
FIG. 2 is a cross-sectional view schematically showing the structure of the electrodeless self-ballasted fluorescent lamp of the first embodiment.

As shown in FIG. 2, in the electrodeless self-ballasted fluorescent lamp, the electrodeless fluorescent lamp 3, the ballast circuit 4 (circuit board 54) and the lamp base 56 are formed as one unit. In this embodiment, the electrodeless fluorescent lamp 3 includes a discharge bulb 17 having a recessed portion 17a, and an induction coil 16 made up of a core 16a and a coil 16b is inserted into the recessed portion 17a. The coil 16b is electrically connected to the circuit board 54, and a cover 55 for accommodating the circuit board 54 is provided around the circuit board 54. The lamp base 56 (e.g., E26 type for incandescent lamp) is attached to a lower part of the cover 55, and is electrically connected to the circuit board 54. By screwing the lamp base 56 into a socket for an incandescent lamp, the supply of electric power is allowed, and thus the operation of the electrodeless fluorescent lamp 3 is enabled. An AC voltage inputted through the lamp base 56 is an AC voltage that is phase-controlled by, for example, an external phase controller (such as a dimmer 2 shown in FIG. 1, typically a dimmer for an incandescent lamp).

The ballast circuit 4 shown in FIG. 1 includes: an AC-DC converter 5 for converting a phase-controlled AC voltage into a DC voltage; a DC-AC converter 6 for converting the DC voltage, which has been converted in the AC-DC converter 5, into a high-frequency voltage; and a dimming controller 7. It should be noted that the AC-DC converter 5, the DC-AC converter 6 and the dimming controller 7 may be called a converter for smoothing an AC voltage into a DC voltage, an inverter and a detector (detection means), respectively.

The ballast circuit 4 is connected to a commercial power supply 1 via the dimmer 2 for carrying out the phase control of a voltage supplied from the commercial power supply 1. Furthermore, the ballast circuit 4 operates the electrodeless fluorescent lamp 3 in response to the turn-on of the voltage phase-controlled in the dimmer 2. The commercial power supply 1 is an AC power supply for 60 Hz and 100V, for example, and the dimmer 2 is connected thereto. The dimmer 2 is one that carries out phase control using a triac, and a commercially available dimmer for an incandescent lamp can be typically used as the dimmer 2.

The AC-DC converter 5 converts the phase-controlled voltage, supplied from the dimmer 2, into a DC voltage. As the AC-DC converter 5, one that utilizes a diode bridge and a smoothing capacitor, for example, may be used. The DC-AC converter 6 is formed so as to intermittently drive the electrodeless fluorescent lamp 3 due to the existence of an operating period during which the converted high-frequency voltage is applied to the electrodeless fluorescent lamp 3 so that the electrodeless fluorescent lamp 3 is operated, and an extinguishing period during which the generation of the high-frequency voltage is stopped so that the electrodeless fluorescent lamp 3 is extinguished.

As shown in FIG. 1, the DC-AC converter 6 of the present embodiment includes: an oscillator 8; a switching circuit 9; a driving circuit 10; switching elements (MOSFETs 11 and 12); a resonant inductor 13; and resonant capacitors 14 and 15. Specifically, the induction coil 16 is connected to the resonant capacitor 15 in series, and furthermore, a series circuit of the induction coil 16 and the resonant capacitor 15 is connected to the resonant capacitor 14 in parallel. In this embodiment, the electrodeless fluorescent lamp 3 is formed by the induction coil 16 and the electrodeless discharge bulb 17. The induction coil 16 is made up of the ferrite core 16a and the coil 16b, and is placed into the recessed portion 17a of the discharge bulb 17.

The dimming controller 7 is formed so as to detect the turn-on of the phase-controlled AC voltage, and so as to output an intermittent command signal for changing the ratio between the operating period and extinguishing period to the DC-AC converter 6 (in particular, the switching circuit 9). Further, the dimming controller 7 is formed so as to output a signal for extinguishing the electrodeless fluorescent lamp 3 before the operation thereof becomes unstable. Furthermore, the dimming controller 7 of the present embodiment is formed so as to output a signal for synchronizing the timing of the turn-on with that of the operation of the electrodeless fluorescent lamp 3 intermittently driven by the DC-AC converter 6. In other words, the dimming controller 7 can be called a synchronous type duty modulator.

As shown in FIG. 1, the dimming controller 7 of the present embodiment includes: a dimming control signal input section A 18; a photo coupler 19; a sawtooth wave generator 20; a dimming command signal input section B 21; a dimming command signal generator 22; and a comparator 23 (e.g., a comparator formed using an operational amplifier). By using the photo coupler 19, the dimming control signal input section A 18 and the sawtooth wave generator 20 can be insulated from each other; therefore, noise reduction can be achieved, and performance increase can be attained. A sawtooth wave is generated using the dimming control signal input section A 18, to which the voltage phase-controlled by the dimmer 2 is inputted, the photo coupler 19 and the sawtooth wave generator 20. Furthermore, a dimming command signal is generated using the dimming command signal input section B 21 and the dimming command signal generator 22, and then, the sawtooth wave is sent to the non-inverting input terminal of the comparator 23 while the dimming command signal is sent to the inverting input terminal of the comparator 23; thus, from the resulting voltage difference, the comparator 23 generates an intermittent dimming signal.

Hereinafter, operations to be performed in the configuration of the first embodiment will be briefly described.

First, an output voltage from the commercial power supply 1 is phase-controlled in the dimmer 2, and then the phase-controlled AC voltage is converted into a DC voltage in the AC-DC converter 5.

Next, the driving circuit 10 for the MOSFETs 11 and 12 of the DC-AC converter 6 is driven in response to an output at a driving frequency f1 (Hz) from the oscillator 8. By allowing the two MOSFETs 11 and 12 to alternately turn on and off, the DC voltage smoothed by the AC-DC converter 5 is converted into a high-frequency voltage.

Subsequently, the high-frequency voltage is applied to a resonant circuit made up of the resonant inductor 13, the resonant capacitors 14 and 15, and the induction coil 16. Due to a current flowing through the induction coil 16, an AC electromagnetic field is generated within the electrodeless discharge bulb 17, and an energy supplied by the AC electromagnetic filed causes excitation of a light-emitting gas (not shown) enclosed within the electrodeless discharge bulb, resulting in light emission. As the light-emitting gas, for example, mercury, krypton, xenon or a gas mixture thereof may be used. Optionally, a gas containing only a rare gas but no mercury may also be used.

Note that, in that case, the timing of the turn-on of the phase-controlled voltage is detected by the dimming controller 7, and the turn-on of the intermittent command signal synchronized with the turn-on of the phase-controlled voltage occurs in the dimming controller 7 and is transmitted to the switching circuit 9. Over the period during which the intermittent command signal is transmitted to the switching circuit 9 (i.e., the on period, or the operating period of the electrodeless fluorescent lamp 3), the switching circuit is turned on, and the driving circuit 10 for the MOSFETs 11 and 12 is turned on. To the contrary, over the period during which the intermittent command signal is not transmitted to the switching circuit 9 (i.e., the off period, or the extinguishing period of the electrodeless fluorescent lamp 3), the switching circuit 9 is turned off, and the driving circuit 10 for the MOSFETs 11 and 12 is turned off. During the on period of the switching circuit 9, the turning on and turning off of the MOSFETs 11 and 12 are alternately repeated with the driving frequency f1 (Hz). In accordance with a variation in the conduction period of the voltage phase-controlled by the dimmer 2, the ratio between the on period and off period of the switching circuit 9, determined by the intermittent command signal from the dimming controller 7, is changed, and in accordance with this change, the ratio between the on period and off period of the MOSFETs 11 and 12 (which will be herein called a duty ratio) is varied. That is, the variation in the duty ratio causes a change in an electric energy input to the electrodeless fluorescent lamp 3, thus carrying out dimming of the electrodeless fluorescent lamp 3.

Figure 3:
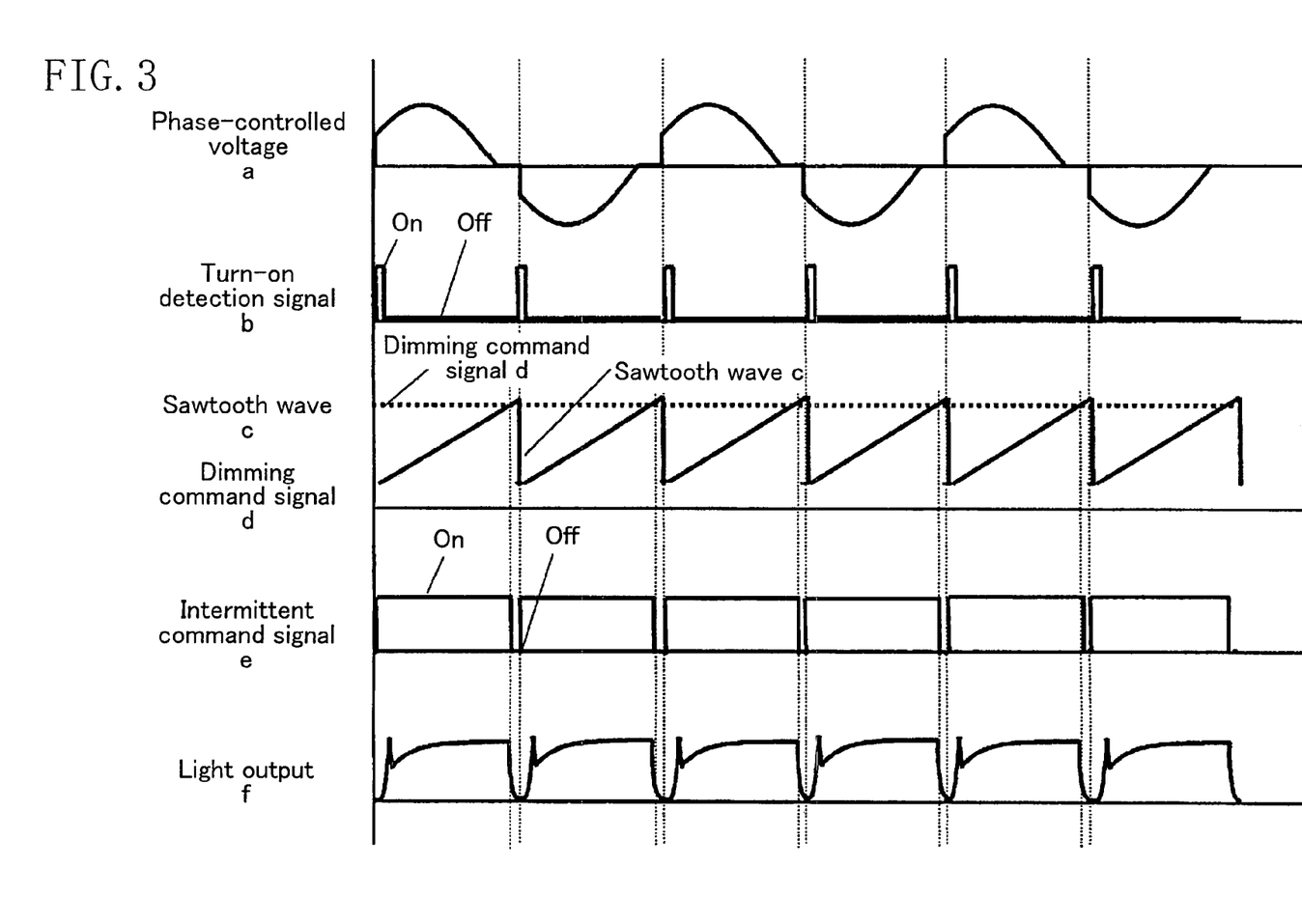
FIG. 3 illustrates waveform charts showing various waveforms in the configuration of the first embodiment.

Hereinafter, the operation of the dimming controller 7 will be described in detail with reference to also FIG. 3. FIG. 3 shows the relationships among a phase-controlled voltage a, a turn-on detection signal b, a sawtooth wave c, a dimming command signal d, an intermittent command signal e, and a light output f, wherein in the five charts, each horizontal axis is a time axis, and the time axis serves as a common measure in the respective charts.

The phase-controlled voltage a in FIG. 3 is first inputted to the dimming control signal input section A 18 in the dimming controller 7 shown in FIG. 1. Then, the phase-controlled voltage a is full-wave rectified in the dimming control signal input section A 18, and is subsequently reduced to a voltage (e.g., 2V) appropriate for the driving of the photo coupler 19 and applied to the photo coupler 19.

Concurrently with the turn-on of the voltage phase-controlled in the dimmer 2, there occurs the turn-on of the full-wave rectified voltage inputted to the photo coupler 19. Next, after the rise time of the photo coupler 19 (e.g., 20 μs), a light emitting diode incorporated into the photo coupler 19 emits light.

Due to the light emission of the diode, a pulse wave synchronized with the turn-on and turn-off of the phase-controlled voltage a is outputted from a transistor that forms a part of the photo coupler 19. Then, due to the existence of an IC such as a monostable multivibrator, the sawtooth wave generator 20 outputs the turn-on detection signal b synchronized only with the turn-on of the phase-controlled voltage a by using, as a trigger input, the turn-on signal from the photo coupler 19.

The turn-on detection signal b is sent to a base terminal of the transistor, a capacitor connected between an emitter and a collector of the transistor is charged and discharged, and the sawtooth wave c is outputted.

On the other hand, the phase-controlled voltage a is inputted to the dimming control signal input section B 21 of the dimming controller 7 shown in FIG. 1, and is half-wave rectified by the dimming control signal input section B 21. Then, in the dimming command signal generator 22, the half-wave rectified portion of the phase-controlled voltage is integrated, and thereafter the dimming command signal d is outputted.

The comparator 23 receives, at its non-inverting input terminal and inverting input terminal, the sawtooth wave c and the dimming command signal d, respectively, and outputs the intermittent command signal e in accordance with the potential difference between both the signals.

Thereafter, the intermittent command signal e is transmitted to the switching circuit 9, and during the on period of the intermittent command signal e, the MOSFETs 11 and 12 of the DC-AC converter 6 are driven with the driving frequency f1 (Hz), thereby obtaining the light output f.

The on state of the intermittent command signal e is maintained until the potential of the sawtooth wave c becomes higher than that of the dimming command signal d. Upon inversion of the potential relationship, the intermittent command signal e becomes off, which is transmitted to the switching circuit 9, and the driving of the MOSFETs 11 and 12 is stopped, thus extinguishing light.

In this manner, the duty of the intermittent command signal e is determined by the potential relationship between the potential of the sawtooth wave c and that of the dimming command signal d, and furthermore, the operation during the on period of the intermittent command signal and the extinguishing during the off period of the intermittent command signal are repeated, thus enabling intermittent dimming.

In addition, the sawtooth wave generator 20 is set such that a certain potential is secured even if electrical charges of the capacitor for charge and discharge are completely discharged. For example, if three diodes, each having a forward voltage of about 0.6V, are connected to the emitter terminal, the minimum potential of the sawtooth wave c becomes about 1.8V. Besides, since the charge and discharge are carried out using, as a trigger, the signal of the turn-on of the phase-controlled voltage, the sawtooth wave maintains a constant waveform even if the conduction angle of the phase-controlled voltage is changed. On the other hand, since the half-wave rectified portion of the phase-controlled voltage is integrated, the potential of the dimming command signal d is changed, and if the potential of the dimming command signal d becomes equal to or lower than a certain potential (minimum potential) of the sawtooth wave c, all the intermittent command signals e enter the off period. And at or below a certain conduction angle of the phase-controlled voltage (i.e., at or below a conduction angle at which the minimum potential of the sawtooth wave c and the potential of the dimming command signal d become equal to each other), the driving of the MOSFETs 11 and 12 of the DC-AC converter 6 is stopped and thus the light is extinguished.

Thus, by adjusting the minimum potential of the sawtooth wave, the driving of the MOSFETs 11 and 12 of the DC-AC converter 6 can be stopped and the light can be extinguished at an arbitrary phase level of the phase-controlled voltage from the dimmer 2.

Hereinafter, with reference to also FIG. 4, description will be made about the relationship between the conduction angle of the phase-controlled voltage, and the on duty of the intermittent command signal in the present embodiment.

Figure 4A:
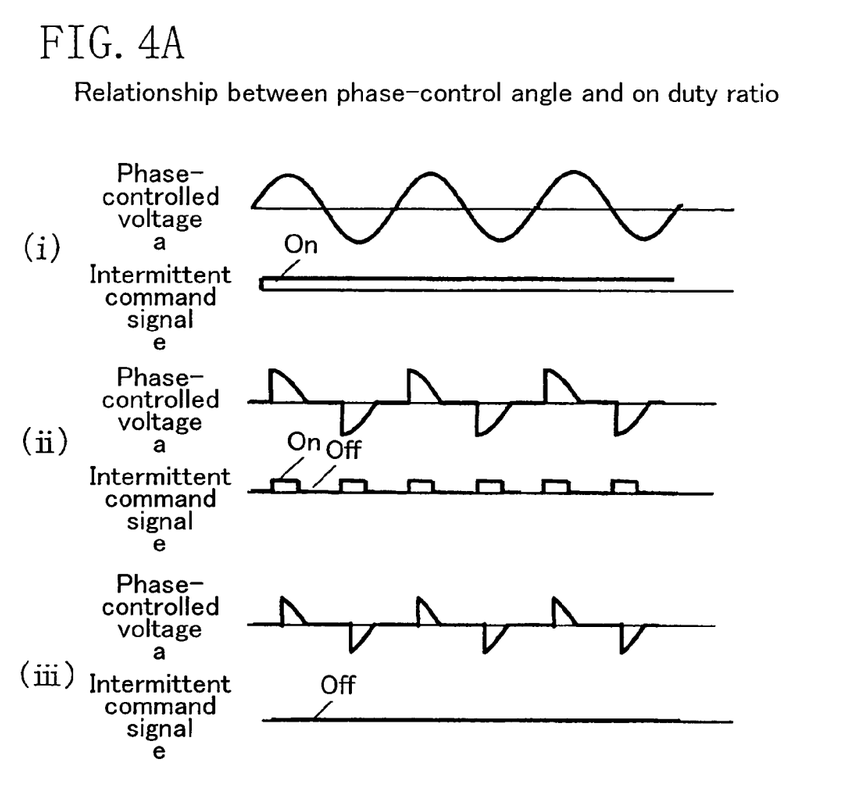
FIG. 4A illustrates waveform charts showing the relationship between phase-control angle and on duty ratio.

FIG. 4A shows the relationship between the phase-controlled voltage a and the intermittent command signal e. In FIG. 4A, (i) illustrates the case where the phase-control angle is about 0°, (ii) illustrates the case where the phase-control angle is about 90°, and (iii) illustrates the case where the phase-control angle is about 120°. Furthermore, in the six charts showing the waveforms of the phase-controlled voltage a and the intermittent command signal e, each horizontal axis is a time axis, and the time axis serves as a common measure in the respective charts.

The phase-controlled voltage a shown in FIG. 4A is first inputted to the dimming control signal input section A 18 of the dimming controller 7 shown in FIG. 1, and is rectified in the dimming control signal input section A 18. Next, the intermittent command signal e is transmitted to the switching circuit 9 via the comparator 23, and thus the MOSFETs 11 and 12 of the DC-AC converter 6 are driven with the driving frequency f1 (Hz).

In the present embodiment, as can be seen from (iii) in FIG. 4(a), even if the phase-controlled voltage a is remaining, the intermittent command signal e is off. That is, before the operation of the electrodeless fluorescent lamp 3 becomes unstable, the dimming controller 7 outputs a signal for extinguishing the electrodeless fluorescent lamp 3.

Figure 4B:
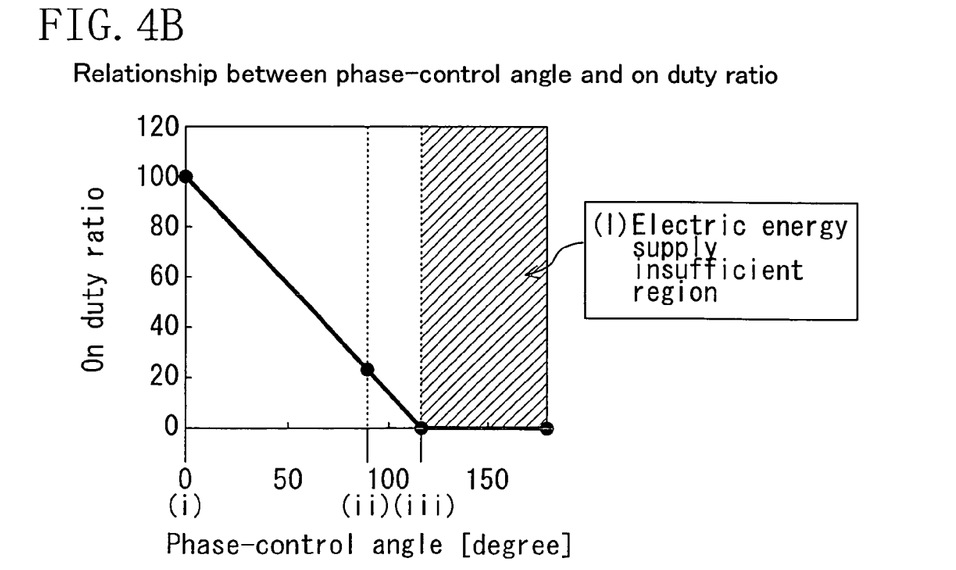
FIG. 4B is a graph showing the relationship between the phase-control angle and the on duty ratio.

FIG. 4B shows the relationship between the phase-control angle and on duty ratio, and the horizontal axis represents the phase-control angle while the vertical axis represents the on duty ratio. In FIG. 4B, (I) signifies an electric energy supply insufficient region where dimming is carried out at a deeper level by the dimmer 2, and the present inventors confirmed that in this region, a voltage applied to the fluorescent lamp 3 is low, and a phenomenon such as undesired extinguishing or flickering might occur.

The electric energy supply insufficient region (I) covers the range of the phase-control angle equal to or higher than 120°. If the phase-control angle becomes equal to or higher than 120°, flickering is likely to occur. If the phase-control angle becomes equal to or higher than 150°, many people feel uncomfortable. And if deeper dimming is carried out, the light is undesirably extinguished. In some cases, due to variations in the characteristics of electrodeless self-ballasted fluorescent lamps, flickering does not occur even if the phase-control angle exceeds 120°; however, in order to surely prevent flickering for all the lamps, it is preferable that the electric energy supply insufficient region (I) covers the range of the phase-control angle equal to or higher than 120°.

In addition, during the period over which the phase-control angle changes from 0° to 120°, i.e., until the on duty ratio changes from 100 to 0, the on duty ratio is linearly decreased in accordance with an increase in the phase-control angle. That is, in this range, an approximate linear function relationship with a negative slope is established between the phase-control angle and the on duty ratio. Therefore, when the dimmer is operated, in this range, the light emission output of the lamp is also substantially linearly decreased in accordance with an increase in the approximate phase-control angle, and thus the dimming of the lamp can be carried out with ease.

In this embodiment, before the electric energy supply insufficient region (I) is reached, the on duty ratio of the intermittent command signal e is reduced to 0, and the electrodeless fluorescent lamp 3 is extinguished; therefore, a problem such as flickering or operation failure does not occur.

Note that the on time width t of the monostable multivibrator can be freely set by the equation, t=0.693 RC (where R and C represent a resistor and a capacitor which are added to the IC, respectively). In the case where the on time width is long, even after the electrical charges of the capacitor for charge and discharge are completely discharged, the charge will not start, and the off period (minimum potential period) of the sawtooth wave c becomes long. This narrows the adjustment range of the on period of the intermittent command signal resulting from the voltage difference between the sawtooth wave c and the dimming command signal d; as a result, the adjustment range of the driving period of the MOSFETs is also narrowed, and thus a low dimming level cannot be achieved. Accordingly, the shorter the on time width of the monostable multivibrator, the wider the adjustment range of the on period of the intermittent dimming command signal. On the other hand, since the sawtooth wave is a signal resulting from the charge and discharge of electrical charges, a sufficient discharge time has to be set in order to obtain a stable sawtooth wave. Therefore, if the maximum output level of the sawtooth wave is about 4V, for example, the discharge time is preferably about 0.4 ms upon due consideration.

In the case where a hysteretic comparator is used instead of the comparator 23, unneeded output inversion is not carried out even if an input signal includes noise, and as a result, the dimming that causes no flickering can be carried out.

As described above, in the electrodeless self-ballasted fluorescent lamp of the first embodiment, the dimming controller 7 is formed so as to output a signal for extinguishing the electrodeless fluorescent lamp 3 before the operation thereof becomes unstable; thus, deep dimming (i.e., low level dimming) can be stably carried out. That is, the turn-on of the AC voltage phase-controlled in an incandescent lamp dimmer, for example, can be accurately detected so as to start the driving, and in addition, the driving can be stopped within the range in which an application voltage required for the start of operation of the fluorescent lamp is obtainable, thus achieving smooth dimming operation that causes no flickering.

It should be noted that in the present embodiment, the configuration of the electrodeless self-ballasted fluorescent lamp has been described; however, the present embodiment may also be applied to an electrodeless self-ballasted discharge lamp having no fluorescent material. In other words, the present embodiment may be applied to a discharge lamp such as a lamp for sterilization in which no fluorescent material is applied to its discharge bulb. Furthermore, the application is not limited to general illumination but may include, for example, the operation of a lamp for emitting rays of light for a person's health, which has an action spectrum effective against erythema or effective in generating vitamin D, or a lamp for growing plants, which has an action spectrum effective in enabling photosynthesis or morphogenesis of plants. In addition, as can be understood from the circuit diagram shown in FIG. 1, the configuration of the present embodiment is not limited to a self-ballasted lamp operating device, but may be applied to a discharge lamp operating device (i.e., an electrodeless discharge lamp operating device) in which the electrodeless fluorescent lamp 3 and the ballast circuit 4 are independently provided.

Hereinafter, a brief description will be made about the frequency of the high-frequency voltage applied from the ballast circuit 4 to the electrodeless fluorescent lamp 3 in the electrodeless self-ballasted fluorescent lamp of the present embodiment. The frequency in the present embodiment is in a relatively low frequency range of 1 MHz or less (e.g., 50 kHz to 500 kHz) as compared with an ISM frequency band of 13.56 MHz or several MHz which is practically and generally utilized. The frequency in such a low frequency range is used because of the following reasons. First, if the lamp is operated in a relatively high frequency range such as 13.56 MHz or several MHz, a noise filter for suppressing line noise generated from a high-frequency power supply circuit within the ballast circuit (circuit board) is increased in size, which undesirably increases the volume of the high-frequency power supply circuit. Further, supposing that noise radiated or propagated from the lamp is high-frequency noise, since laws and regulations are very strictly restricting the high-frequency noise, an expensive shield has to be provided and utilized in order to meet the restrictions, which presents a serious obstacle in achieving cost reduction. To the contrary, if the lamp is operated in a frequency range of about 1 MHz to 50 kHz, inexpensive general-purpose products, which are used as electronic components for general electronic equipment, can be utilized as components for forming the high-frequency power supply circuit; in addition, since the use of small-sized components is enabled, not only cost reduction but also size reduction can be achieved, thus obtaining considerable advantages. It is to be noted that the electrodeless fluorescent lamp of the present embodiment does not have to be operated at a frequency of 1 MHz or less, but may alternatively be operated in a frequency range of 13.56 MHz or several MHz, for example.

Embodiment 2

Hereinafter, a second embodiment of the present invention will be described with reference to FIG. 5. Although the configuration of a discharge lamp operating device of the present embodiment is similar to that described in the first embodiment, a sawtooth wave generator 20 for detecting the turn-on of a phase-controlled voltage is formed differently from the counterpart in the first embodiment, and can be formed inexpensively without using any IC in the configuration of the present embodiment.

Figure 5:
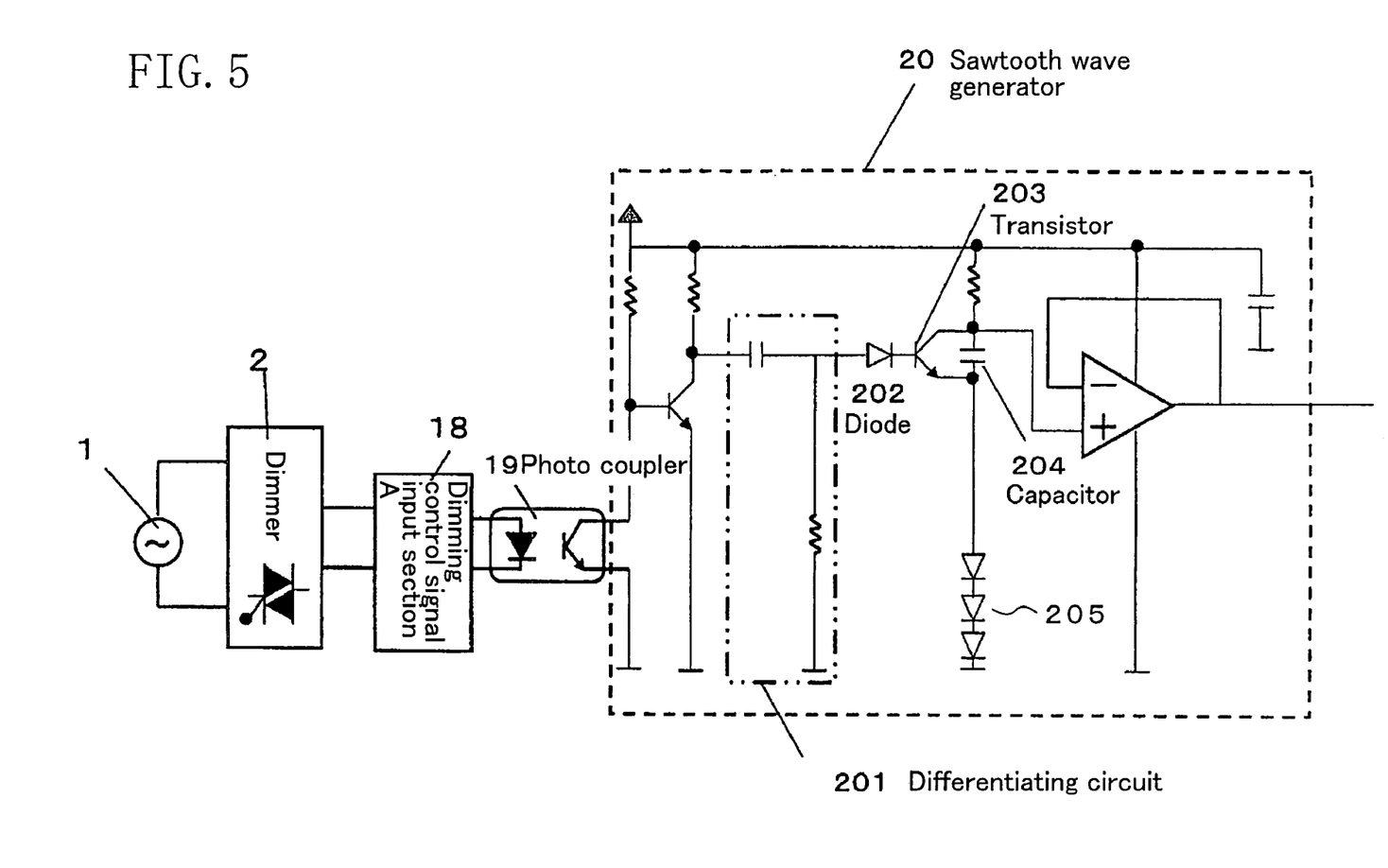
FIG. 5 is a diagram showing the circuit configuration of a discharge lamp operating device according to a second embodiment of the present invention.

FIG. 5 shows a circuit for detecting the turn-on of a phase-controlled voltage in the present embodiment, and in particular shows the configuration of the sawtooth wave generator 20. It should be noted that the same constituting elements as the counterparts described in the first embodiment are identified by the same reference characters, and the further description thereof will be omitted.

The sawtooth wave generator 20 shown in FIG. 5 has: a differentiating circuit 201; a diode 202; a transistor 203; and a capacitor 204, and the differentiating circuit 201 includes a capacitor and a resistor. The sawtooth wave generator 20 is connected to a dimming control signal input section A 18 via a photo coupler 19, the dimming control signal input section A 18 is connected to a dimmer 2, and the dimmer 2 is electrically connected to a commercial power supply 1. It should be noted that a transistor may be provided between the photo coupler 19 and the differentiating circuit 201 for current amplification.

In the present embodiment, the differentiating circuit 201 is connected to a collector terminal of the transistor of the photo coupler 19, which generates a pulse wave synchronized with the turn-on and turn-off of a phase-controlled AC voltage. An output terminal of the differentiating circuit 201 is connected with an anode of the diode 202, while a cathode of the diode 202 is connected with a base terminal of the transistor 203 for discharge. Between a collector terminal and an emitter terminal of the transistor 203 for discharge, the capacitor 204 for charge and discharge is connected. Further, the emitter terminal of the transistor 203 for discharge is connected, in series, with three diodes 205 for potential adjustment. It should be noted that anode terminals of the diodes 205 for potential adjustment are connected to the emitter terminal of the transistor 203 for discharge. Due to such a configuration, the sawtooth wave generator 20 can generate a sawtooth wave synchronized with the turn-on of the phase-controlled voltage.

Hereinafter, operations to be performed in the present embodiment will be briefly described. Note that in the configuration of the present embodiment, the operation of the discharge lamp is based on the same principle as the first embodiment, and the further description thereof will be omitted.

Due to the pulse wave from the photo coupler 19, an output signal of the differentiating circuit 201 becomes a differential wave synchronized with a rising edge and a falling edge of the pulse wave, and only the differential wave synchronized with the rising edge by using the diode 202 with a low leakage current is inputted to the base terminal of the transistor 203. And the capacitor 204 connected between the collector terminal and emitter terminal of the transistor 203 repeats charge and discharge using, as a trigger, the rising edge of the pulse wave from the photo coupler 19, thus allowing the generation of a sawtooth wave. Further, since the emitter terminal of the transistor 203 for discharge is connected with three diodes 205 for potential adjustment, each having a forward voltage of about 0.6V, for example, the minimum potential of the sawtooth wave becomes about 1.8V, thus making it possible to raise the level of a base voltage of the sawtooth wave. Furthermore, since the charge and discharge is carried out using, as a trigger, the signal of the turn-on of the phase-controlled voltage, the sawtooth wave maintains a constant waveform even if the conduction angle of the phase-controlled voltage is changed.

If the configuration of the second embodiment is adopted, it becomes possible to implement the sawtooth wave generator 20 with inexpensive components without using any expensive IC components. In the present embodiment, although three diodes 205 for potential adjustment are used, four or more diodes 205 may alternatively be used, or one or two diodes 205 may optionally be used. Moreover, instead of the diode, a constant-voltage power supply may be used. It should be noted that, more favorably, a buffer circuit is added, thus increasing output impedance.

Embodiment for Reference

Figure 6:
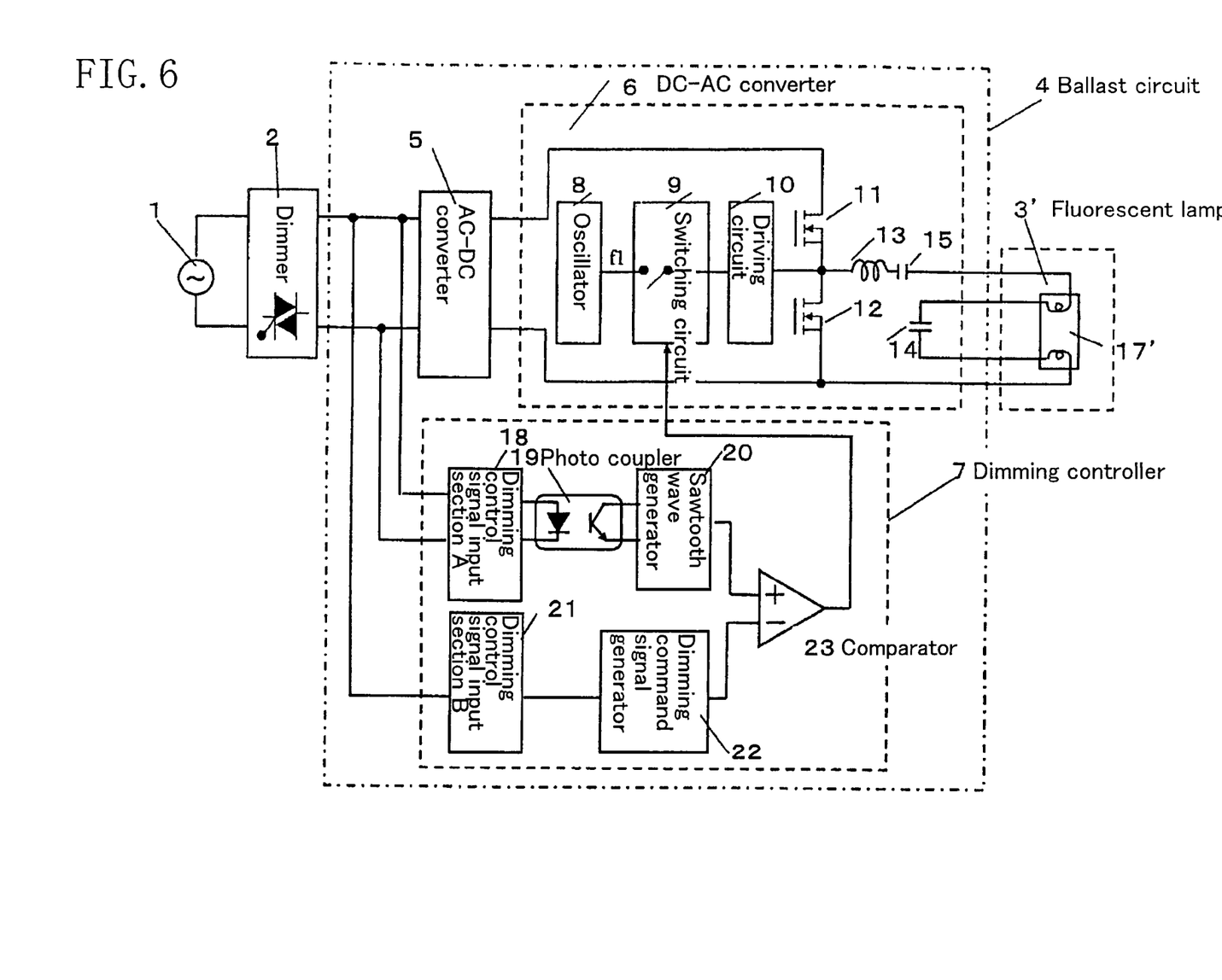
FIG. 6 is a diagram showing the circuit configuration of a discharge lamp operating device according to an embodiment for reference.

FIG. 6 shows a circuit diagram of a device for operating a discharge lamp having electrodes according to an embodiment for reference for purpose of comparison with the embodiments of the present invention. The embodiment for reference differs from the above-described first embodiment in that a discharge bulb 17' has electrodes, and that a load resonant circuit is differently formed for the operation of a fluorescent lamp 3' having electrodes. It should be noted that the same constituting elements as the counterparts described in the first embodiment are identified by the same reference characters, and the further description thereof will be omitted.

In the configuration of the embodiment for reference, as shown in FIG. 6, an LC resonant circuit including: a fluorescent lamp 3'; a resonant inductor 13; a resonant capacitor 15; and a capacitor 14 for resonance and preheat is connected between a drain terminal and a source terminal of a MOSFET 12.

In the configuration of the embodiment for reference, if a high voltage is generated as a resonance voltage at both ends of the capacitor 14 of the LC resonant circuit, the temperature of each electrode is increased due to a preheat current flowing to the two electrodes within the discharge bulb 17', and if the generation of thermion from the electrodes is easily allowed, the discharge bulb 17' causes a breakdown and starts discharge. Once the discharge bulb 17' has started the discharge, the current flowing through the discharge bulb 17' is limited by the resonant inductor 15, thus maintaining the stable discharge.

The configuration and operation of a dimming controller 7 of the embodiment for reference are similar to those of the dimming controller 7 of the first embodiment. By implementing the configuration of the discharge lamp operating device as shown in FIG. 6, it becomes possible to stably carry out dimmable operation of the fluorescent lamp having electrodes when the dimming is relatively shallow. However, if deep dimming is carried out, preheating of the electrodes becomes insufficient and the discharge of electrons is prevented; thus, the light is abruptly extinguished when it has a certain brightness, and the dimming cannot be smoothly carried out. In this respect, the discharge lamp operating device of the embodiment for reference is different from that of the present invention.

Although the discharge lamp operating device of the embodiment for reference includes the fluorescent lamp 3' having electrodes, the ballast circuit 4 for carrying out intermittent driving is not very suitable for use in combination with the fluorescent lamp 3' having electrodes according to the embodiment for reference, but is more suitable for use in combination with the electrodeless fluorescent lamp 3 of the first and second embodiments. This is because since the intermittent driving is an operation that repeats turning-on and turning-off, the electrodes of the fluorescent lamp 3' are severely worn out, thus causing the problem that their lives are shortened. In the present invention, since the electrodeless discharge lamp 3 has no electrode to begin with, such a problem will not occur.

It should be noted that in the first embodiment of the present invention, the dimming controller 7 is formed so as to output a signal for synchronizing the timing of the turn-on of the phase-controlled voltage with that of the operation of the lamp intermittently driven by the DC-AC converter 6 because dimming operation can be carried out more favorably if the synchronization is achieved.

Figure 7:
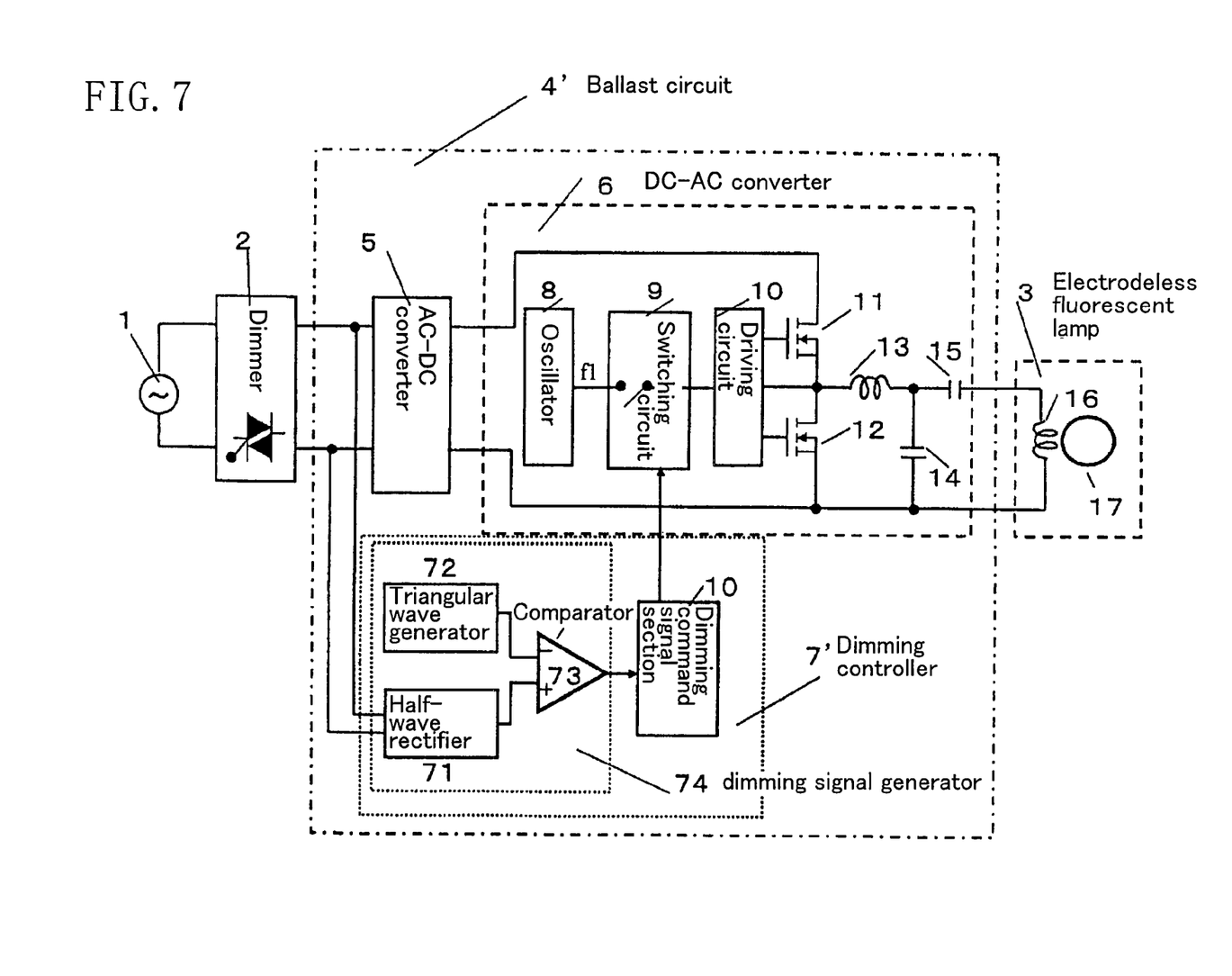
FIG. 7 is a diagram showing the circuit configuration of an asynchronous type discharge lamp operating device.

In the configuration shown in FIG. 7, a ballast circuit 4' carries out intermittent driving, but is not intended to synchronize the timing of the turn-on of the phase-controlled voltage with that of the operation of the lamp intermittently driven by a DC-AC converter 6. The configuration shown in FIG. 7 differs from that of the first embodiment in that a dimming controller 7' is formed so as to generate a dimming control signal and send a dimming command signal to the DC-AC converter (inverter circuit) 6.

The dimming controller 7' is made up of: a dimming signal generator 74; and a dimming command signal section 10 for sending the dimming command signal to the DC-AC converter 6. An output from a dimmer 2, phase-controlled by a triac, is half-wave rectified through a half-wave rectifier 71, a comparator 73 compares the resulting output voltage (120 Hz) with an output voltage from a triangular wave generator 72 for generating a reference voltage with a reference frequency (120 Hz), and then the comparator 73 outputs a pulse shape dimming signal with a constant frequency. The dimming signal is sent to the DC-AC converter 6 via the dimming command signal section 10, and the dimming of the electrodeless fluorescent lamp 3 is carried out while the on time and off time of the DC-AC converter 6 being changed. The electrodeless fluorescent lamp is used as a discharge lamp, the switching frequency f1 of the inverter circuit is 200 kHz, and MOSFETs are used as switching elements.

Figure 8:
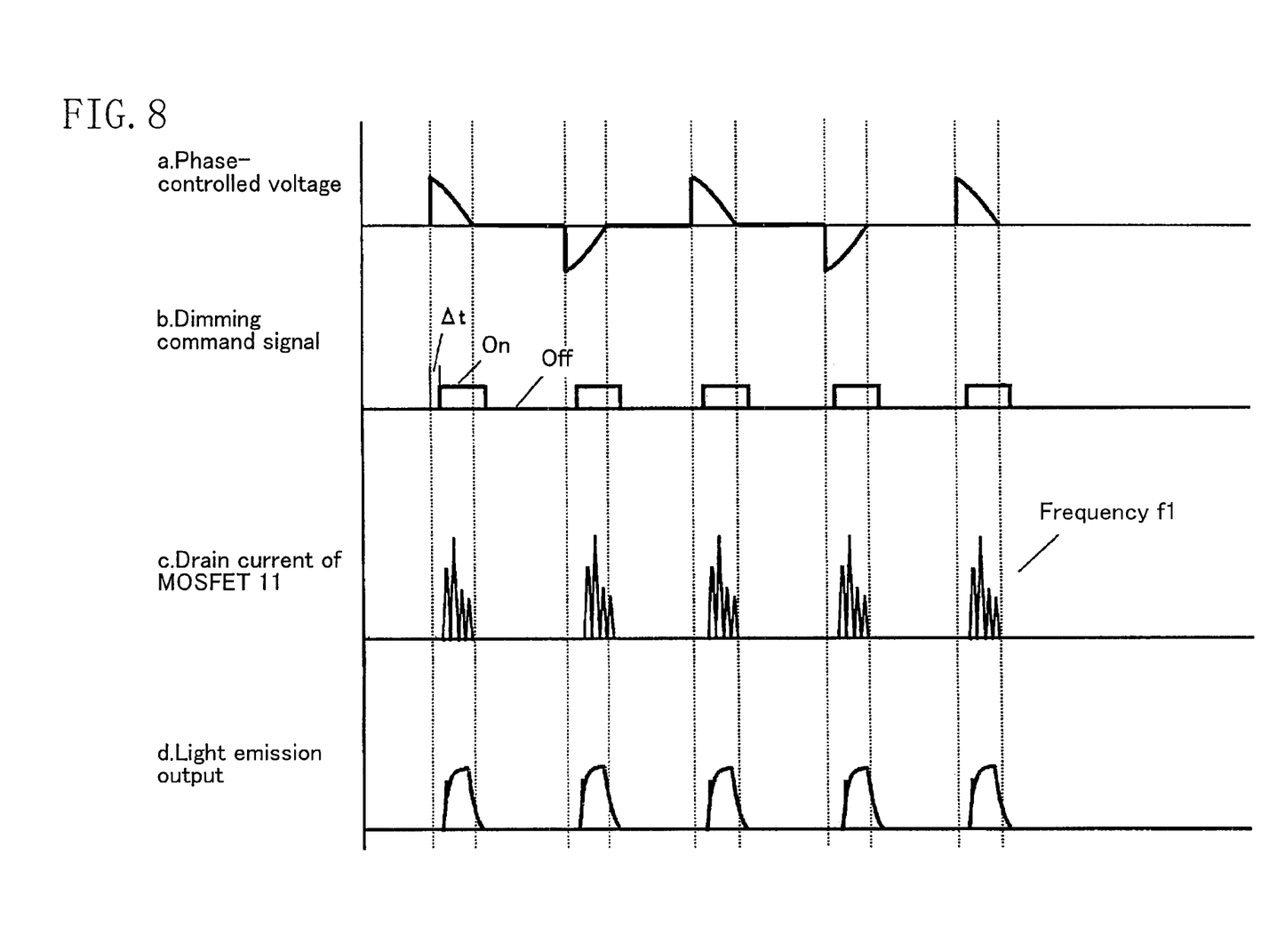
FIG. 8 illustrates various waveform charts concerning the discharge lamp operating device shown in FIG. 7.

FIG. 8 shows experimental results obtained from the configuration shown in FIG. 7. Hereinafter, in addition to the contents shown in FIG. 8, the operation and characteristic of the discharge lamp operating device shown in FIG. 7 will be described.

FIG. 8 illustrates waveform charts showing waveforms a through d, in which each horizontal axis is a time axis, and the time axis serves as a common measure in the respective waveform charts.

In FIG. 8, a represents the waveform of the voltage phase-controlled in the dimmer 2. As can be seen from this chart, the conduction angle of the triac of the dimmer 2 is close to $\pi$, and therefore, considerably deep dimming is carried out. In FIG. 8, b represents the dimming command signal that is sent from the dimming controller 7' to the DC-AC converter 6 when the phase-controlled voltage such as one having the waveform a in FIG. 8 is inputted to the ballast circuit 4'.

As can be understood from the comparison made between the waveforms a and b in FIG. 8, the turn-on of the phase-controlled voltage is not synchronized with the turn-on of the dimming command signal. That is, after the turn-on of the phase-controlled voltage, the sending of the dimming command signal from the dimming controller 7' to the DC-AC converter is delayed by a time period $\Delta t$. Since a large amount of energy is required for the start of operation of the electrodeless fluorescent lamp 3, a large drain current flows through each of the MOSFETs 11 and 12 at the moment of operation of the lamp as indicated by the waveform c in FIG. 8. If the turn-on of the dimming command signal is delayed from that of the phase-controlled voltage by the time period $\Delta t$, the rising of the drain current of each of the MOSFETs 11 and 12 is delayed. Thus, a period of time during which a high-frequency electric power is supplied to the electrodeless fluorescent lamp 3 and a period of time for light emission are reduced accordingly, and in addition, the driving of the DC-AC converter is stopped in the state where the phase-controlled voltage right after the turn-on thereof is at a highest level; consequently, a reduction in the light emission output of the electrodeless discharge lamp is significant.

If deeper dimming is carried out using the dimmer 2, the drain current of each of the MOSFETs 11 and 12 is decreased, and as a result, the high-frequency electric power supplied to the electrodeless fluorescent lamp 3 is reduced, and a threshold state where the lamp is operated or extinguished is nearly reached.

Figure 9:
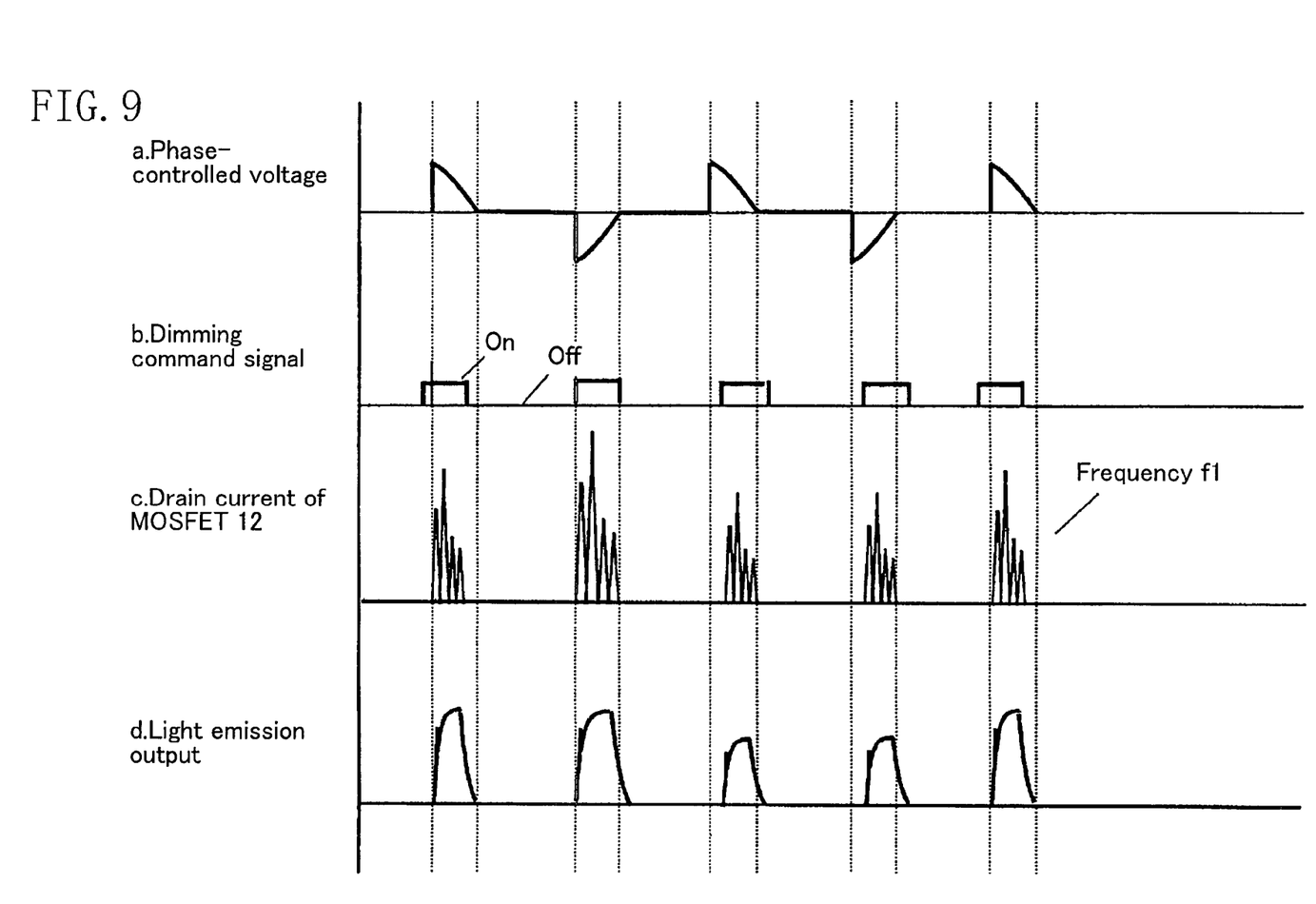
FIG. 9 illustrates various waveforms charts concerning the discharge lamp operating device shown in FIG. 7.

In other example, there occurs a time lag as shown in FIG. 9. Also in this example, since the synchronization is not achieved, the high-frequency electric power supplied to the electrodeless fluorescent lamp 3 is similarly reduced, and the threshold state where the lamp is operated or extinguished is nearly reached. In such a state, flickering or undesirable extinguishing easily occurs, and furthermore, in carrying out deep dimming, the electrodeless fluorescent lamp cannot be operated at all if the time lag $\Delta t$ becomes too long.

According to the present invention, even if such an unstable state exists, the dimming controller is formed so as to output a signal for extinguishing the lamp before the operation thereof becomes unstable, and therefore, smooth dimming can be carried out. Furthermore, by achieving the synchronization in this case, it becomes possible to reduce the possibility of reaching the unstable state even if deeper dimming is carried out, and the range in which the actual brightness is variable (i.e., the range of the actual dimming) can be extended accordingly; as a result, a more outstanding dimmable electrodeless discharge lamp can be implemented, thus providing a preferred embodiment. Specifically, in the discharge lamp operating device (e.g., the electrodeless self-ballasted fluorescent lamp) described in each of the foregoing embodiments, if the voltage phase-controlled by the dimmer is inputted to the fluorescent lamp so that the fluorescent lamp is dimmed, the timing of the turn-on of the phase-controlled voltage is synchronized with that of the turn-on of the intermittent command signal for intermittently driving the DC-AC converter 6, and the fluorescent lamp can be extinguished before the operation of the discharge lamp becomes unstable due to the approach of the conduction angle of the phase-controlled voltage to $\pi$ and the resulting reduction of the voltage applied to the lamp. Consequently, stable dimming operation can be achieved.

In the inventive electrodeless self-ballasted fluorescent lamp and discharge lamp operating device, the dimming controller is formed so as to output a signal for extinguishing the electrodeless fluorescent lamp (or discharge lamp) before the operation of the electrodeless fluorescent lamp (or discharge lamp) becomes unstable, thus making it possible to achieve smooth dimming operation that causes no flickering.

INDUSTRIAL APPLICABILITY

The present invention is effective where it is applied to electrodeless discharge lamps, and the industrial applicability of the present invention is excellent in that an electrodeless self-ballasted fluorescent lamp connected to a dimmer, in particular, can be smoothly dimmed without causing any flickering.

What is claimed is:
1. An electrodeless self-ballasted fluorescent lamp comprising:
an electrodeless fluorescent lamp;
a ballast circuit for applying a high-frequency voltage to the electrodeless fluorescent lamp; and
a lamp base electrically connected to the ballast circuit, wherein the electrodeless fluorescent lamp, the ballast circuit and the lamp base are formed as one unit, wherein the ballast circuit comprises:

an AC-DC converter for converting a phase-controlled AC voltage into a DC voltage;

a DC-AC converter for converting the DC voltage into a high-frequency voltage, the DC-AC converter being formed so as to intermittently drive the electrodeless fluorescent lamp due to the existence of an operating period during which the high-frequency voltage is applied to the electrodeless fluorescent lamp so that the electrodeless fluorescent lamp is operated, and an extinguishing period during which the generation of the high-frequency voltage is stopped so that the electrodeless fluorescent lamp is extinguished; and a dimming controller formed so as to detect the turn-on of the phase-controlled AC voltage and output an intermittent command signal that changes the ratio between the operating period and the extinguishing period to the DC-AC converter, and wherein the dimming controller is formed so as to output a signal for extinguishing the electrodeless fluorescent lamp before the operation thereof becomes unstable.

2. The electrodeless self-ballasted fluorescent lamp of claim 1, wherein the dimming controller comprises:

a first dimming control signal input section and a second dimming control signal input section;

a sawtooth wave generator for generating a sawtooth wave; and a dimming command signal generator for generating a dimming command signal, wherein the first dimming control signal input section is connected to the sawtooth wave generator via a photo coupler, and wherein the second dimming control signal input section is connected to the dimming command signal generator.

3. The electrodeless self-ballasted fluorescent lamp of claim 2, wherein the sawtooth wave generator and the dimming command signal generator are connected to a comparator.

4. The electrodeless self-ballasted fluorescent lamp of claim 1, wherein the dimming controller is further formed so as to output a signal for synchronizing the timing of the turn-on with that of the operation of the lamp intermittently driven by the DC-AC converter.

5. The electrodeless self-ballasted fluorescent lamp of claim 1, wherein the dimming controller has a sawtooth wave generator comprising a differentiating circuit that comprises a capacitor and a resistor, wherein the differentiating circuit is connected to a collector terminal of a transistor for generating a pulse wave synchronized with the turn-on and turn-off of the phase-controlled AC voltage, wherein an output terminal of the differentiating circuit is connected with an anode of a diode, while a cathode of the diode is connected with a base terminal of a transistor for discharge, wherein an emitter terminal of the transistor for discharge is connected with a diode for potential adjustment, and wherein a capacitor for charge and discharge is connected between the emitter terminal and collector terminal of the transistor for discharge, thus allowing the generation of a sawtooth wave synchronized with the turn-on of the phase-controlled voltage.

6. The electrodeless self-ballasted fluorescent lamp of claim 1, wherein the phase-controlled AC voltage is an output voltage of a dimmer which has been phase-controlled by the dimmer.

7. A discharge lamp operating device comprising:

a discharge lamp;

an AC-DC converter for converting a phase-controlled AC voltage into a DC voltage;

a DC-AC converter for converting the DC voltage into a high-frequency voltage, the DC-AC converter intermittently driving the discharge lamp due to the existence of an operating period during which the high-frequency voltage is applied to the discharge lamp so that the discharge lamp is operated, and an extinguishing period during which the generation of the high-frequency voltage is stopped so that the discharge lamp is extinguished; and a dimming controller for detecting the turn-on of the phase-controlled AC voltage and for outputting an intermittent command signal that changes the ratio between the operating period and the extinguishing period to the DC-AC converter, wherein the discharge lamp is an electrodeless discharge lamp, and wherein the dimming controller is formed so as to output a signal for extinguishing the discharge lamp before the operation thereof becomes unstable.

8. The discharge lamp operating device of claim 7, wherein the dimming controller is further formed so as to output a signal for synchronizing the timing of the turn-on with that of the operation of the lamp intermittently driven by the DC-AC converter.

9. The discharge lamp operating device of claim 7, wherein the discharge lamp has a discharge bulb having a recessed portion, and wherein an induction coil is inserted into the recessed portion of the discharge bulb.

* * * * *